May 29, 1934.  W. QUAST  1,960,921
AUTOMOBILE SIGNAL
Filed Dec. 11, 1933   2 Sheets-Sheet 1
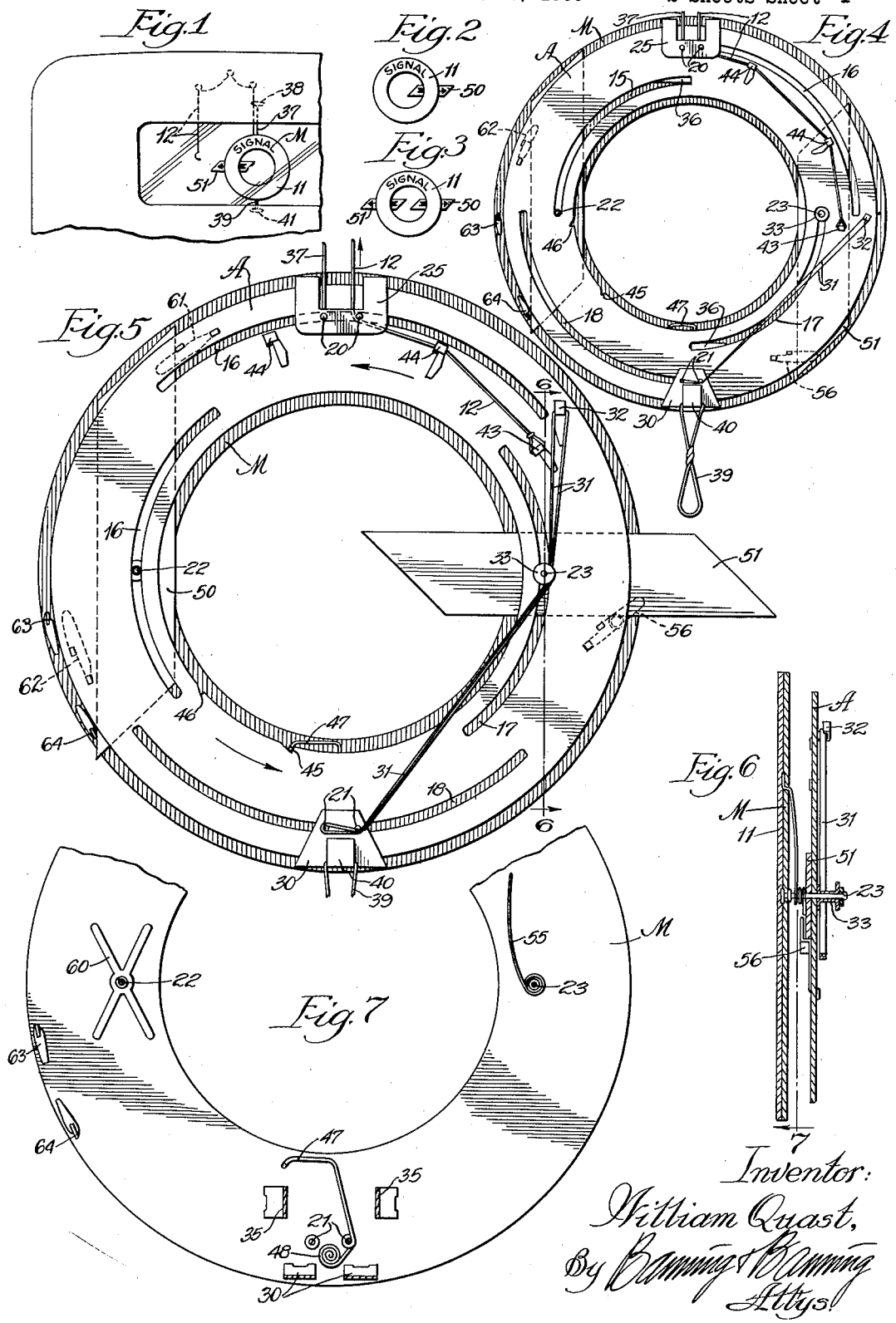

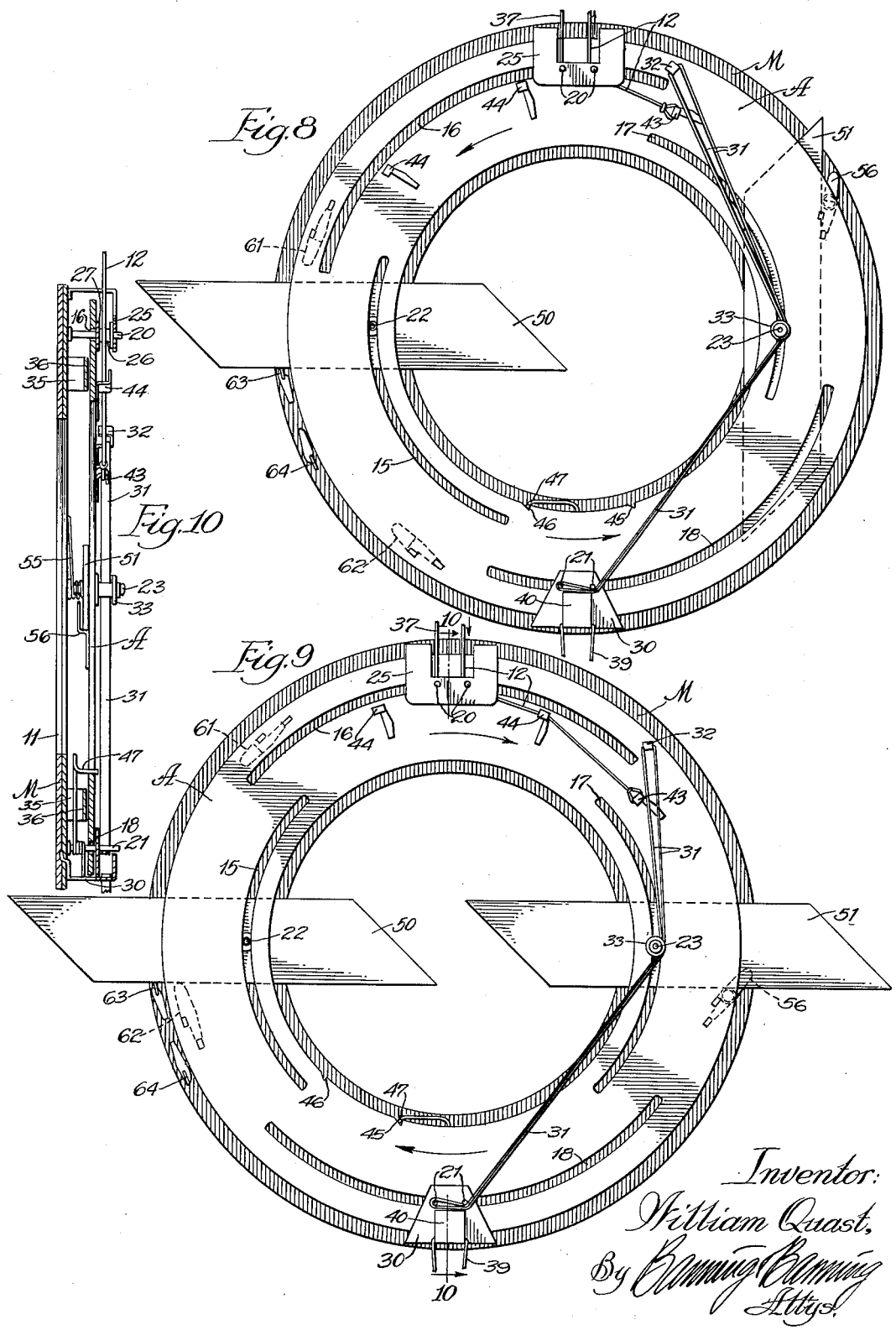

Patented May 29, 1934

1,960,921

UNITED STATES PATENT OFFICE 1,960,921

AUTOMOBILE SIGNAL

William Quast, Chicago, Ill.

Application December 11, 1933, Serial No. 701,775

9 Claims. (Cl. 116—51)

This invention relates to a signal operable as by the driver of an automobile to indicate an impending stop, or a turn to either the right or left. In the form illustrated, it is adapted for mounting adjacent the rear window of an automobile so as to be visible to those in cars following.

For its objects, my invention is directed to various features of simplicity, low cost, and effective display, thereby rendering the signal suitable for advertising purposes. The indicating arms are movable to selected positions by means of a single control, thereby conducing to ease in operation. In addition, the parts entering into the construction may be produced and assembled at small expense, permitting the apparatus to be sold at small cost so as to open up possibilities for its use as a medium for the display of advertising.

A suggestive embodiment of this invention is illustrated in the accompanying drawings in the manner following:

Figure 1 is an exterior view of an automobile rear window through which may be seen the present signal device operated to indicate a left turn;

Figs. 2 and 3 are diagrammatic views of the signal operated to indicate a right turn, and stop, respectively;

Fig. 4 is a view in elevation, looking toward the opposite or front face of the signal, the parts being in normal position to indicate proceed;

Fig. 5 is a view similar to Fig. 4, but somewhat enlarged as to scale, showing the right arm (the left as viewed from the rear) operated;

Fig. 6 is a detail in section on line 6—6 of Fig. 5;

Fig. 7 is a fragmentary view in elevation of the mounting ring looking toward the front face thereof;

Figs. 8 and 9 are views similar to Fig. 4, showing in indicating position the left arm (the right as viewed from the rear), and both arms together, respectively; and Fig. 10 is a sectional view taken on line 10—10 of Fig. 9.

The signal apparatus herein shown comprises a mounting plate M which may have the form of a ring to which is applied a facing 11, and an actuating plate A, also in ring form, in register with the mounting ring, slightly spaced therefrom, and connected rotatably therewith. The facing which may carry any desired legend or advertising, is turned toward the rear of the automobile so as to be visible through the back window thereof adjacent which it is suspended in place. The indicators, of which two are shown, are movably supported between the two rings so as to be projected from concealed positions within the confines thereof to other positions of exposure, preferably beyond both the inner and outer peripheries of the two rings. This movement of the indicators is accomplished by rotating the actuating ring relative to the mounting ring as through the medium of a pull cord 12 which extends to a point close to the driver so as to be convenient for manipulation.

As shown, the actuating ring is provided with four arcuate slots each extending through about 90° in a portion of the ring separate from the other slots. Viewed from the top side, as shown in Figs. 4, 5, 8 and 9, the four slots 15, 16, 17 and 18 extend through the left and right upper sectors and the left and right lower sectors, respectively. The slots 15 and 17 lie closer to the inner edge, and the slots 16 and 18 closer to the outer edge, of the actuating ring. To sustain this ring rotatably upon the mounting ring, I provide at the top of the device a pair of pins 20 arranged side by side, at the bottom a pair of similarly arranged pins 21, and at opposite sides, left and right, respectively, other guide pins 22 and 23. Each of these pins extends rigidly from a base which is affixed to the mounting plate, and continues on to pass through one of the four arcuate slots by which (1) to guide the actuating ring in a fixed rotative path of movement which is concentric with the mounting ring and (2) to afford stops engageable with opposite ends of the slots for arresting movements of the actuating ring at the conclusion of its oscillating range of 90° or thereabouts.

To connect the one ring inseparably to the other, I employ at the top a clip 25 whose base is affixed to the mounting plate. The clip which is desirably open in the middle extends over the periphery of the actuating ring and down over a portion of its forward face in spaced relation thereto to receive the ends of the two pins 20. Also surrounding these same pins are a pair of bushings 26 extended from a bearing plate 27, the outer ends of the bushings being flanged (see Fig. 10). The length of these bushings is such that they act, in conjunction with the clip, as spacers to hold the bearing plate close to the actuating ring. A second clip 30 is also affixed to the mounting plate adjacent its bottom. This clip extends around the periphery of the actuating ring and then upwardly over a portion of its forward face close thereto. The two pins 21 may be received through this clip to furnish anchorage for one end of a tension device 31 such as a rubber band or coiled spring whose opposite end is hooked over a catch 32 upon the actuating ring at a point adjacent the guide-stop pin 23. By this means the actuating ring is maintained in normal position such as is shown in Fig. 4. To reach any other position, as, for example, those shown in Figs. 5, 8 and 9, the tension device must yield, and in so doing it is obliged to engage and track over the pin 23 which is equipped with a roller 33 to minimize friction at this point.

The two clips 25 and 30 serve to hold the actuating ring in assembled relation with the mounting plate, but do not act to maintain the one in a definitely spaced relation to the other. To accomplish this latter end, I provide a plurality of spacers 35 each affixed to the mounting plate and comprising a laterally turned bearing piece 36 which lies proximate to the inner or rear face of the actuating ring. At least two such spacers are used, one at the top and the other at the bottom of the device.

The structure in its entirety may be suspended in position adjacent the rear window of an automobile, as already stated, and as a convenient means of attachment, I would suggest a cord 37 having its lower end connected to one of the pins 20 and extended therefrom through the open center of the top clip 25 to a point thereabove; at its upper end the cord may be equipped with a suitable pin 38 adapted to enter the car upholstery and engage therewith. Supplementing this suspension cord is a resilient connection at the bottom which, as shown, comprises a tension device 39, such as a rubber band, which is hooked over a tongue 40 that may conveniently be struck out from the bottom clip 30. This tension device is also connected with a suitable pin 41 adapted to take into the upholstery so as to secure the signal apparatus resiliently at its bottom.

The apparatus thus far described comprises a mounting plate to which is connected in spaced relation a movable actuating plate, the whole forming one complete unit adapted for positioning adjacent a window through which the signal is to be displayed. To operate the actuating ring, I utilize the flexible cord 12 which is connected at one end to a catch 43 adjacent the catch 32 and passes in a generally tangential way over rests 44 and thence around one of the pins 20 and out through the open center of the top clip to a point adjacent the driver for his convenient manipulation. When the cord is pulled, the tension device 31 is required to yield, and if the pull be sudden or excessive the lower tension device 39 may yield also so as to safeguard the signal against injury. The oscillating range of the actuating ring is about 90°, as already stated, the movement limit being determined by the ends of the several arcuate slots abutting the guide pins. When the pull cord is relaxed, the actuating ring will return to its initial position, as shown in Fig. 4, under the influence of the tension device 31. I provide means, however, by which to releasably maintain the actuating ring in either of two advanced positions, one about half way and other near its limit, comprising two ratchet notches 45 and 46 formed in the inner edge of the actuating ring at points something less than 45° apart, and a pawl 47 engageable therewith formed from a wire which is pivoted to swing upon one of the lower guide pins 21, the lower end of the wire being laterally weighted as by a coil 48 so as to maintain the acting end of the pawl in light engagement with the inner periphery of the actuating ring. With such an assembly of parts the actuating ring is free to advance through its entire range of movement, the pawl riding over each notch as the latter pass by. By controlling the return movement so that the ring rotates slowly, the pawl will engage in the notch first to come along, thereby holding the actuating ring releasably at such point. If the ring be then advanced slightly and allowed to return without retardation, the notch (or notches as the case may be) will slide past the pawl so that the actuating ring will arrive back at initial or normal point. These movements of the actuating ring are all effected through manipulation of the single pull cord 12 so that the operator may (1) advance the ring to the point of engaging the first notch 45 (something less than 45°), (2) advance the ring to the point of engaging the second notch 46 (something less than another 45°), (3) permit return of the ring from the second to the first notch, (4) permit return of the ring from the first notch to normal position, or (5) permit return of the ring to normal position directly from the second notch without halting at the first notch.

Between the mounting and actuating rings are positioned two indicating arms 50 and 51 on diametrically opposite sides of the structure, pivoted, respectively, to the guide pins 22 and 23. The form and construction of these two arms are substantially alike. When in normal position each arm is accommodated within the confines of the two rings so as to be hidden from view, but when swung through 90° or thereabouts, the opposite ends of the arms are thereupon projected into view. By so arranging the connections that only one arm, as selected, or both arms together, are swung into transverse indicating positions, as suggested in Figs. 5, 8 and 9, the signal will be operated for a left or right turn or a stop. The means for controlling the movements of these indicating arms is the actuating ring already described plus certain parts as follows:

Associated with the left arm (the one which appears to the right as viewed from the front as in Figs. 5, 8 and 9) is a wire spring 55 coiled about the guide pin 23 with one end anchored to the mounting ring. The other end of the spring is connected to the indicating arm so as to normally swing it clockwise to the vertical concealed position of Fig. 4 where it rests against a stop 56. This stop which is carried upon the rear or inner side of the actuating ring also serves as a finger to swing the indicating arm when the ring is rotated in response to operation of the pull cord. Starting first from a position adjacent the inside edge of the arm, i. e., the edge which lies closest to the center of the actuating ring, this finger slides along the arm, turning it first to a transverse position, as shown in Fig. 5, at which point the pawl is engaged within the first notch, and then continues on to advance the arm through a further 90° until it is again vertical, but reversed with respect to its normal position. At the conclusion of this movement the pawl lies in the second notch, and the finger is disposed to the outside of the indicating arm although in engagement with the same edge as when the operation first started. It will be noted, therefore, that the actuating ring serves through the agencies just described to move the indicating arm 51 to either transverse position or reversed vertical position, and that the pawl and notch device acts to hold the arm releasably in either the transverse or reversed vertical positions, according as the pull cord is operated.

The right indicating arm (the one which appears to the left, as viewed from the front as in Figs. 5, 8 and 9) is pivoted to swing through 90° only, or thereabouts. Associated with this arm is a friction device 60 in the form of a flat spring having spreading feet which bear against the mounting plate. Through this spring is extended the guide pin 22 upon which the arm is pivoted, the spring thereby exerting a thrust upon the inner face of the arm so as to normally hold it against movement. Except for this friction device the arm is free to swing at all times. A pair of fingers 61 and 62 carried by the actuating ring engage in turn with opposite edges of the arm to swing it from the vertical position of Fig. 5 to the transverse position of Fig. 8, and vice versa, where it bears, respectively, against rests 63 and 64 affixed to the mounting plate. These fingers are so disposed that operation of the arm to transverse position takes place only during rotation of the actuating ring through the latter half of its movement range, and reverse movement to vertical position only during rotation of the actuating ring through the last half of its return movement range. The movements of this arm 50 are accordingly delayed in relation to those of the other indicating arm 51. In whatever position the arm is moved to it will there remain due to the braking effect of the friction device already described.

In practice, the following manipulations are made: (1) to operate the left turn arm 51, the actuating ring is advanced to the point where the pawl engages the first notch 45, and to return the arm to normal position the ring is advanced just a little further and then released permitting it to return all the way to initial position and swing the arm back to vertical at the same time; (2) to operate the right turn arm 50, the actuating ring is advanced to the point where the pawl engages the second notch 48, and in so doing the left turn arm will be reversed to occupy a position of concealment, and to return the two arms to normal position the ring is advanced just a little further and then released whereupon it will return all the way to initial position and swing both arms back to the normal vertical at the same time; and (3) to operate both arms so that they will together form a stop signal, the actuating ring is advanced to its limit, then released to permit a return movement which is checked just before the first notch reaches the pawl so that the right turn arm remains in transverse position and the left turn arm is swung back from the reversed vertical to transverse position. The return of the two arms to normal is accomplished by advancing the ring slightly so as to disengage the pawl and releasing the ring for return under the influence of its tension device.

The signal apparatus herein described may be produced from inexpensive materials such as fibre, sheet metal, etc., and in consequence is light withal being strong and dependable. Obviously there are many variations possible in the form, shape, proportions, etc., of the parts which are used. The essence of my invention resides in the assembly of two plates, one movable with respect to the other and one mounting certain parts which are actuated by the other to project beyond the confines of one or both plates indicators which are thereupon exposed to view, a single control being utilized for the selective operation of such indicators in a desired manner.

I claim:

1. A signal apparatus of the kind described comprising two spaced plates, one movable relative to the other, indicating means movably positioned between the plates and disposed wholly within the confines thereof when in normal position, and parts on the two plates co-acting with each other and with the indicating means for projecting the latter selectively in response to movement of one plate relative to the other.

2. A signal apparatus of the kind described comprising a pair of spaced plates mounted to move one with respect to the other, indicating means between the plates normally disposed within the confines thereof and movable in part to positions beyond the confines of the plates, parts carried by the two plates co-acting with each other and with the indicating means to project the latter when one plate is moved relative to the other, the parts being so arranged and organized that a selected indicating means will be operated according to the degree of movement of the two plates relative to each other.

3. A signal apparatus of the kind described comprising a pair of spaced plates, one movable relative to the other, arms pivoted between the plates to swing wholly within the confines thereof or to positions which are exposed in part therebeyond, means for projecting the arms successively as movement of one plate relative to the other proceeds, and other means for releasably maintaining the arms in exposed position.

4. A signal apparatus of the kind described comprising a pair of spaced plates between which are pivoted a plurality of indicators adapted to swing from a normal concealed position to a position of exposure, and means responsive to movement of one plate relative to the other for operating the indicators successively to expose the same selectively.

5. A signal apparatus of the kind described comprising a pair of relatively rotatable rings superimposed in spaced relation and mounting between them a pair of pivoted arms adapted to swing from positions of concealment to positions of exposure both interiorly and exteriorly of the rings, and actuating means associated with the two rings and with the arms for advancing the latter selectively to positions of exposure in response to rotation of one ring relative to the other.

6. A signal apparatus of the kind described comprising a pair of relatively rotatable superimposed rings mounting between them a pair of arms pivoted to swing to positions of concealment between the rings or to positions of exposure both inside and outside of the rings, operative connections between the rings and arms such that movement of one ring relative to the other will actuate one or both arms to exposed positions according to the degree of movement of one ring relative to the other, a resilient mounting for one ring, and a pull cord extended from the other ring for operation thereof.

7. A signal apparatus of the kind described comprising a pair of relatively rotatable superimposed rings mounting between them indicating arms adapted to swing from positions of concealment to positions of exposure, stop means for limiting the rotary movement of one ring relative to the other, resilient means for maintaining one ring in a normal position of rest, means for releasably holding the ring last named in a selected position of advance, and operative connections between the two rings and indicating arms such that the latter are selectively projected to positions of exposure in response to rotation of one ring relative to the other.

8. A signal apparatus of the kind described comprising a pair of superimposed spaced rings connected for relative rotation, a pair of indicating arms mounted between the rings to swing from positions of concealment therebetween to positions of exposure beyond the confines thereof, and operative connections between the two rings and indicating arms such that rotation of one ring relative to the other through a limited distance will advance one arm to exposed position, through a further distance will advance such arm still further to a second concealed position and simultaneously advance the other arm to exposed position, and through a partial return movement will swing back the arm first actuated to exposed position, and means for releasably maintaining the one ring in each of such positions relative to the other.

9. A signal apparatus of the kind described comprising a pair of spaced superimposed rings connected for relative rotation, a pair of indicating arms mounted between the rings for swinging movement from positions of concealment therebetween to exposed positions beyond the confines thereof, and operative connections between the two rings and the indicating arms such that movement of one ring relative to the other through varying degrees will swing a selected arm, or both arms, into exposed position.

WILLIAM QUAST.